Figure 1A:
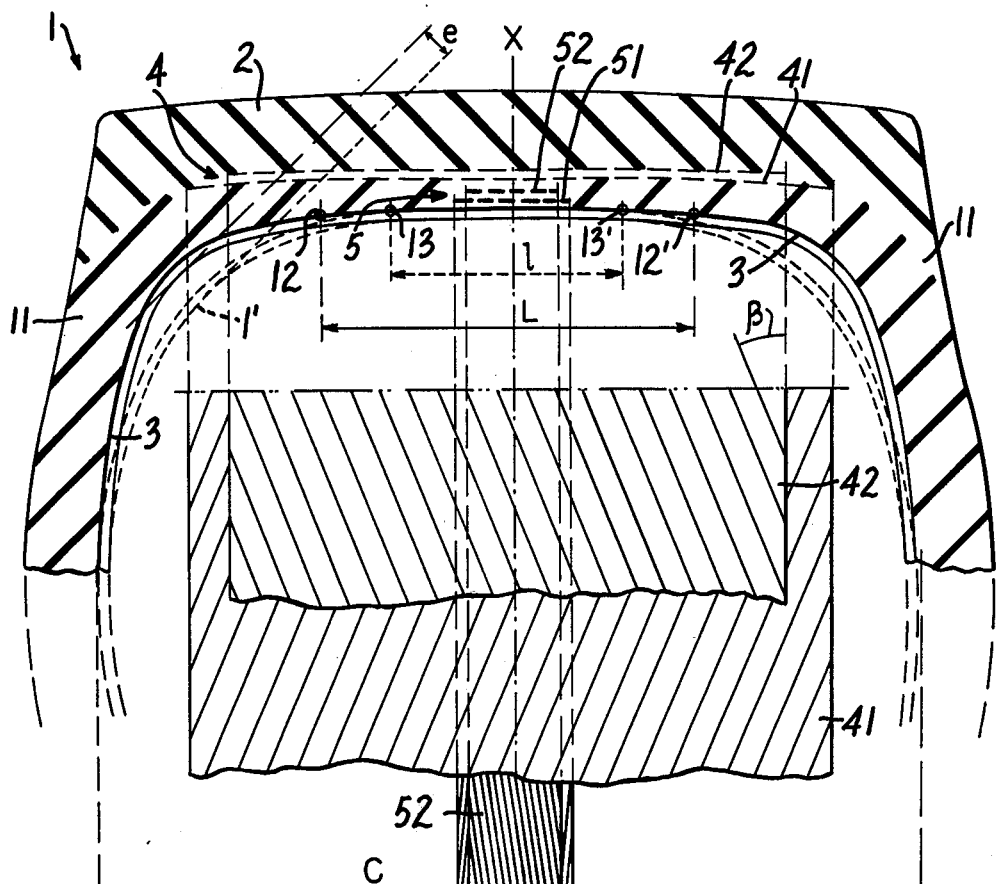

United States Patent [19]

Pommier

[11] 4,274,464
[45] Jun. 23, 1981

[54] RADIAL CARCASS TIRE, PARTICULARLY FOR EARTH-MOVING EQUIPMENT EMPLOYING CARCASS EXPANSION LIMITING BLOCK

[75] Inventor: Jean Pommier, Clermont-Ferrand, France

[73] Assignee: Compagnie Generale des Etablissements Michelin, Clermont-Ferrand, France

[21] Appl. No.: 117,037

[22] Filed: Jan. 30, 1980

Related U.S. Application Data

[63] Continuation-in-part of Ser. No. 19,180, Mar. 9, 1979, abandoned.

[30] Foreign Application Priority Data

Mar. 10, 1978 [FR] France .............................. 78 07386

[51] Int. Cl.³ ........................... B60C 9/20; B60C 9/08
[52] U.S. Cl. ........................ 152/352 R; 152/354 R; 152/359; 152/361 FP; 152/361 DM
[58] Field of Search ........... 152/352 R, 353 R, 354 R, 152/361 R, 361 FP, 361 DM, 359

[56] References Cited

U.S. PATENT DOCUMENTS

| | | | |
|---|---|---|---|
| 2,884,040 | 4/1959 | Boussu et al. ....................... | 152/356 |
| 3,018,814 | 1/1962 | Saint-Paul ....................... | 152/361 FP |
| 3,515,197 | 6/1970 | Boileau ....................... | 152/361 FP |
| 3,677,319 | 7/1972 | Mirtain ....................... | 152/361 DM |
| 3,789,900 | 2/1974 | Verdier ....................... | 152/356 |
| 4,016,916 | 4/1977 | Ravagnani ....................... | 152/354 |

FOREIGN PATENT DOCUMENTS

| | | | |
|---|---|---|---|
| 1921750 | 11/1970 | Fed. Rep. of Germany ...... | 152/361 R |
| 1214031 | 4/1960 | France ....................... | 152/361 R |
| 2141557 | 1/1973 | France ....................... | 152/354 R |
| 808824 | 2/1959 | United Kingdom ....................... | 152/361 R |

Primary Examiner—Caleb Weston
Assistant Examiner—Lois E. Boland
Attorney, Agent, or Firm—Brumbaugh, Graves, Donohue & Raymond

[57] ABSTRACT

A radial carcass tire is improved due to the fact that a limiting block composed of two crossed plies is interposed between the radial carcass reinforcement and the tread reinforcement. These two plies have wires or cables which have low extensibility and which form with the longitudinal direction angles whose value is other than zero and less than one-half of the smallest angle used in the tread reinforcement.

11 Claims, 3 Drawing Figures

RADIAL CARCASS TIRE, PARTICULARLY FOR EARTH-MOVING EQUIPMENT EMPLOYING CARCASS EXPANSION LIMITING BLOCK

This application is a continuation-in-part application of U.S. application Ser. No. 19,180, filed Mar. 9, 1979, now abandoned.

The present invention relates to improvements in tires with a radial carcass reinforcement anchored on both sides to at least one bead ring and with a tread reinforcement having a meridian curvature less than that of the radial carcass reinforcement and which, on the one hand, is formed of at least two superimposed plies of wires or cables which are parallel in each ply, crossed from one ply to the other and form acute angles of less than 30° with the longitudinal direction of the tire, and, on the other hand, is parallel to the radial carcass reinforcement along an equatorial zone, the radial carcass reinforcement having in its radially outer half a meridian profile whose maximum curvature is located at the place of the shoulders and whose minimum curvature is located between the shoulders of the tire.

The decrease of the meridian curvature of the tread reinforcement corresponds to the need of improving certain properties of the tires of the type described here (road-holding ability, life of the tread, etc.). However, the application of this means to large-size tires, such as those provided on large and very large tank and other trucks or earth-moving equipment, leads to a very large accumulation of rubber at the level of the shoulders of the tires. This results in heating which is prejudicial to the useful life of such tires.

In French Pat. No. 2,141,557, which corresponds to U.S. Pat. No. 3,789,900, it has been proposed to decrease the amount of the masses of rubber in the zones of the shoulders while retaining the reduced curvature of the tread reinforcement.

The thinning at the shoulders is obtained by lifting the radial carcass reinforcement radially towards the outside by means of corrective plies arranged at the level of the shoulders on the inside of the radial carcass reinforcement. Such an arrangement decreases the heating in the zone of the shoulders, but it may cause heating in the equatorial zone jeopardizing the life of the crown reinforcement as a result of the widening of the equatorial zone along which the radial carcass reinforcement, parallel to the tread reinforcement, transmits to the latter the expansion force due to the inflation pressure.

The object of the present invention is to neutralize the influence of the expansive thrust of the radial carcass reinforcement on the tread reinforcement and thus alleviate the drawbacks of the known arrangements.

The invention is characterized by the fact that it consists in tires of the known type with radial carcass reinforcement lifted radially towards the outside in the zone of the shoulders, in arranging, in the equatorial zone where the tread reinforcement is parallel to the radial carcass reinforcement and between these two reinforcements, a limiting block formed of two superimposed plies of wires or cables of low extensibility which are parallel to each other in each ply and crossed from one ply to the other forming with the longitudinal direction of the tire angles of opposite sign, each being both other than zero and less in absolute value than one-half of the smallest angle used in the tread reinforcement and preferably between 5° and 10°, this limiting block having a width less than the width of the equatorial zone along which the tread reinforcement is parallel to the radial carcass reinforcement.

The tension T per unit of width measured in the axial direction which is exerted on a ply by the radial carcass reinforcement can be evaluated in first approximation by means of the formula $T = p \cdot R/(2 \cos^2 \alpha)$. In this formula, p is the inflation pressure of the tire, R is the radius of the ply with respect to the axis of rotation of the tire and $\alpha$ is the angle of the cables of the ply with the longitudinal direction. This formula indicates why the invention contemplates using in the limiting block angles $\alpha$ which are less than one-half the smallest angle used in the tread reinforcement. Thus the tension T of a ply of the limiting block is always less than the tension of the ply having the smallest angle in the tread reinforcement. The elongation of the limiting block under the effect of the tension coming from the radial carcass reinforcement is therefore less. this avoids transmitting this tension to the tread reinforcement.

In order to screen off as far as possible the transmission of tensions coming from the pressure of the radial carcass reinforcement, and taking into account the fact that no ply reinforcement element, even of steel or of glass fiber, is inextensible in actual practice, the invention contemplates arranging the reinforcement elements of the plies of the limiting block at an angle other than 0° with respect to the longitudinal direction. The crossed plies have, as a matter of fact, a tendency to decrease the meridian curvature of the limiting block under the effect of an internal pressure. By means of the invention, the meridian curvature of the radial carcass reinforcement as well as the corresponding thinning of the shoulders is easily controlled.

By wires or cables of low extensibility there are understood wires or cables, preferably metallic, for instance of steel, having a relative elongation $\Delta l/l$ less than 0.2% under a load equal to 10% of their rupture load. These cables can be produced with a high cable lay which is between 12 and 20 times the apparent diameter of the cable. These wires or cables are preferably arranged contiguous to each other.

Another advantage of the replacement of the corrective plies in the shoulders by the limiting block in accordance with the invention is the placing under compression of the masses of rubber forming the shoulders of the tire, that is to say, the lateral zones of the tread. This state of stresses decreases the tendency for the commencement of fatigue cracks at the bottom of the recessed elements possibly present in the lateral zones of the tread. This state is due to the fact that outside of the equatorial zone covered by the limiting block, the radial carcass reinforcement tends towards its natural meridian equilibrium profile, that is to say towards the profile which it would assume in the absence of any reinforcement, under the effect of the inflation pressure.

On the other hand, in order to increase as desired the width of the equatorial zone along which the radial carcass reinforcement is parallel to the tread reinforcement, it is sufficient in general to use a limiting block whose width is between 5% and 80% of the maximum axial width of the radial carcass reinforcement and preferably between 12% and 20% for a ratio H/C close to 1, between 24% and 40% for a ratio H/C close to 0.75, and between 45% and 80% for a ratio H/C close to 0.3, H being the radial height of the tire on its rim and C the maximum axial width of the radial carcass reinforcement.

The edges of the limiting block are protected by the fact that they are located in regions of low deformation. One ply of the limiting block is narrower than the other, the difference in width being between 0 and 10% of the width of the widest ply.

It is also possible to form the limiting block by means of a folded ply.

Figure 1B:
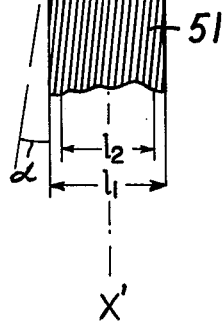
Figure 2:
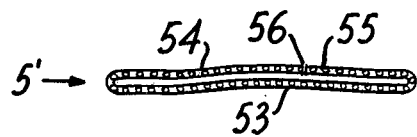

One embodiment of the invention is described below with reference to the drawing in which:

FIG. 1A shows the crown, that is to say the radially outer portion, of a tire provided with a limiting block composed of two plies, shown in radial section, alongside of which in FIG. 1B is a plan view of the plies of wires or cables, essential for an understanding of the invention, and FIG. 2 is a view in radial section on a larger scale of a limiting block composed of a single folded ply.

The crown of the tire 1 shown in FIG. 1A comprises a tread 2, a radial carcass reinforcement 3, a tread reinforcement 4 and a limiting block 5.

The radial carcass reinforcement 3 is formed of a single ply of steel cables fastened in known manner in the beads (not shown) of the tire. In the zone of the crown, the radial carcass reinforcement 3 reaches its minimum curvature at the equator, that is to say at the place where it encounters the trace X–X' of the equatorial plane. In this same zone, the radial carcass reinforcement 3 reaches its maximum curvature at the level of the shoulder 11. The thickness of the shoulders 11 of the tire 1 provided with the limiting block 5 in accordance with the invention is thus reduced by the dimension e as compared with that of the tire 1' (shown in dotted line) not provided with such a limiting block.

Simultaneously, the width L of the equatorial zone included between the two points 12 and 12' along which the tread reinforcement 4 of the tire in accordance with the invention is parallel to the radial carcass reinforcement 3 is greater than the corresponding width 1 between the points 13 and 13' in a tire without a limiting block 5.

The tread reinforcement 4 comprises two superimposed plies 41, 42 of wires or cables crossed from one ply to the other. The limiting block 5 is formed of two superimposed plies 51, 52 between the reinforcements 3 and 4. The radially outer ply 52 crosses the other ply 51 at an opposite angle $\alpha$, this angle $\alpha$ being less than one-half the angle $\beta$ ($\beta$ being less than 30°) formed by the ply 42 with the longitudinal direction X–X'. Furthermore, the radially outer ply 52 (width $l_2$) is narrower than the radially inner ply 51 (width $l_1$); on the other hand, the limiting block (width $l_1$) is narrower than the equatorial zone of width L along which the tread reinforcement 4 is parallel to the radial carcass reinforcement 3. Beyond the equatorial zone L, the tread reinforcement 4 has a smaller curvature than the radial carcass reinforcement 3.

For clarity in the drawing, the wires or cables of the plies 41, 42 of the tread reinforcement 4 have been represented in FIG. 1B by straight lines spaced an exaggerated distance apart. However, the wires or cables of the limiting block 5 are shown closer together to show that, in accordance with a preferred variant, they are contiguous.

FIG. 2 illustrates the variant in which the limiting block 5' is formed of a ply 53 whose edges 54, 55 are folded so as to meet along a great circle 56 parallel to the longitudinal direction X–X'. However, the limiting block 5 can also be made by folding a ply such as 51 of suitable width on itself.

Although in the foregoing and in the claims which follow, reference is made to the smallest angle used for the plies of the tread reinforcement with respect to the longitudinal direction, the invention applies just as well as to the case in which the plies in question form equal angles (in absolute value) with said direction, so that the angle which the wires or cables of the limiting block form with the longitudinal direction must be smaller than the angle (and not the smallest angle) of the plies of the tread reinforcement.

It is also useful to employ a limiting block 5 consisting of two crossed plies 51, 52, the wires or cables of which make different angles $\alpha$ in absolute value while remaining of opposite sign. The advantage of such asymmetrical arrangement is to correct, if necessary, lateral (axial) non-uniformity thrusts induced by the tread reinforcement 4, or to prevent, especially in cases where a relatively wide limiting block 5 is used, the generation of such nonuniformity thrusts by the limiting block 5 itself. These thrusts may disturb the vehicle behavior and cause uneven wear of the tread 2.

In fact, a limiting block 5 formed by two symmetrically disposed plies 51, 52 (e.g., at angles $+\alpha$ and $-\alpha$) basically generates such harmful thrusts, because the two plies 51, 52 are not located at the same distance from the axis of rotation of the tire 1. Consequently, a limiting block 5 which does not generate lateral thrusts has its wires or cables disposed at asymmetrical angles $\alpha$. By preference, the limiting blockply 51, the wires or cables of which are oriented at the greater angle should be disposed radially inside the other ply 52. A satisfactory angular arrangement is thus 8° for the radially inner ply 51 and 3° for the radially outer ply 52.

What is claimed is:

1. A tire with a radial carcass reinforcement anchored on both sides to at least one bead ring and with a tread reinforcement having a meridian curvature less than that of the radial carcass reinforcement and which, on the one hand, is formed of at least two superimposed plies of wires or cables parallel in each ply and crossed from one ply to the other forming angles of less than 30° with the longitudinal direction of the tire and, on the other hand, is parallel to the radial carcass reinforcement along an equatorial zone, the radial carcass reinforcement having in the radially outer half a meridian profile whose minimum curvature is located between the shoulders of the tire and whose maximum curvature is located at the place of the shoulders, characterized by the fact that, in the equatorial zone where the tread reinforcement is parallel to the radial carcass reinforcement and between these two reinforcements, there is arranged a limiting block formed of two superimposed plies of wires or cables of low extensibility which are parallel to each other in each ply and crossed from one ply to the other forming with the longitudinal direction angles of opposite sign, each being both other than zero and less in absolute value than one-half of the smallest angle used in the tread reinforcement, this limiting block having a width less than the width of the equatorial zone along which the tread reinforcement is parallel to the radial carcass reinforcement and further characterized by the fact that the wires or cables of low extensibility of the limiting block have a relative elongation less than 0.2% under a load equal to 10% of their rupture load.

2. The tire according to claim 1, characterized by the fact that the opposite angles formed by the wires or cables of the two plies of the limiting block are asymmetrical with the longitudinal direction of the tire.

3. The tire according to claim 2, characterized by the fact that the wires or cables of the radially inner ply of the limiting block form a greater angle than that of the wires or cables of the radially outer ply of the limiting block.

4. The tire according to claim 3, characterized by the fact that the angle of the wires or cables of the radially inner ply is 8° and the angle of the wires or cables of the radially outer ply is 3° in absolute value.

5. The tire according to claim 1, characterized by the fact that the opposite angles formed by the wires or cables of the two plies of the limiting block are symmetrical with the longitudinal direction of the tire.

6. The tire according to claim 5, characterized by the fact that the opposite symmetrical angles formed by the wires or cables of the two plies of the limiting block are between 5° and 10° in absolute value.

7. The tire according to claim 2 or claim 5, characterized by the fact that the wires or cables of the two plies of the limiting block are arranged contiguous to each other.

8. The tire according to claim 2 or claim 5, characterized by the fact that the cables of low extensibility reinforcing the two plies of the limiting block consist of steel wires with a cable lay of between 12 and 20 times the apparent diameter of the cable and a relative elongation less than 0.2% under a load equal to 10% of the rupture load of the cable.

9. The tire according to claim 2 or claim 5, characterized by the fact that the limiting block has a width which is between 5% and 80% of the maximum axial width of the radial carcass reinforcement, and preferably between 12% and 20% for a ratio H/C close to 1, between 24% and 40% for a ratio H/C close to 0.75, and between 45% and 80% for a ratio H/C close to 0.3, H being the radial height of the tire on its rim and C being the maximum axial width of the radial carcass reinforcement.

10. The tire according to claim 2 or claim 5, characterized by the fact that one of the plies of the limiting block has a width less than that of the other ply, the difference in width being between 0 and 10% of the width of the other ply.

11. The tire according to claim 5, characterized by the fact that the limiting block is formed of a folded ply.

* * * * *